United States Patent
Keohane et al.

(10) Patent No.: US 9,547,717 B2
(45) Date of Patent: Jan. 17, 2017

(54) ADMINISTRATION OF SEARCH RESULTS

(75) Inventors: Susann Marie Keohane, Austin, TX (US); Gerald Francis McBrearty, Austin, TX (US); Shawn Patrick Mullen, Buda, TX (US); Jessica Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 13/370,008

(22) Filed: Feb. 9, 2012

(65) Prior Publication Data
US 2012/0143852 A1 Jun. 7, 2012

Related U.S. Application Data

(63) Continuation of application No. 11/002,546, filed on Dec. 2, 2004, now Pat. No. 8,135,731.

(51) Int. Cl.
*G06F 17/30* (2006.01)
(52) U.S. Cl.
CPC .............................. *G06F 17/30864* (2013.01)
(58) Field of Classification Search
CPC ................................................ G06F 17/30864
See application file for complete search history.

(56) References Cited

U.S. PATENT DOCUMENTS

| | | | |
|---|---|---|---|
| 5,721,908 A | 2/1998 | Lagarde et al. | |
| 5,787,411 A | 7/1998 | Groff | |
| 6,012,093 A | 1/2000 | Maddalozzo, Jr. et al. | |
| 6,112,202 A | 8/2000 | Kleinberg | |
| 6,336,117 B1 * | 1/2002 | Massarani | 707/711 |
| 6,434,548 B1 | 8/2002 | Emens et al. | |
| 6,487,553 B1 * | 11/2002 | Emens et al. | |
| 6,598,072 B1 | 7/2003 | McBrearty et al. | |
| 6,651,091 B1 | 11/2003 | McBrearty et al. | |
| 6,661,432 B1 | 12/2003 | McBrearty et al. | |
| 6,801,906 B1 * | 10/2004 | Bates et al. | 707/707 |
| 6,823,491 B1 | 11/2004 | McBrearty et al. | |
| 7,975,238 B2 | 7/2011 | Keohane et al. | |
| 2002/0194166 A1 * | 12/2002 | Fowler | 707/3 |
| 2004/0254928 A1 * | 12/2004 | Vronay et al. | 707/5 |
| 2005/0055271 A1 * | 3/2005 | Axe et al. | 705/14 |
| 2005/0060384 A1 | 3/2005 | Keohane et al. | |
| 2005/0086206 A1 * | 4/2005 | Balasubramanian et al. | 707/3 |
| 2005/0210042 A1 * | 9/2005 | Goedken | 707/100 |

(Continued)

OTHER PUBLICATIONS

"U.S. Appl. No. 11/002,546 Final Office Action", Aug. 9, 2007, 12 pages.

(Continued)

*Primary Examiner* — Mahesh Dwivedi
(74) *Attorney, Agent, or Firm* — DeLizio Law, PLLC

(57) ABSTRACT

A web browser displays a set of search results from a web search, each search result indicating a link to a web page. Responsive to selection of a first of the set of search results for exclusion from display, a subset of one or more of the set of search results that indicate related links is identified. The related links comprise links have a same domain name as the link of the first search result. The first search result and the subset of the set of search results are excluded. The search results are displayed without the excluded ones of the set of search results.

11 Claims, 7 Drawing Sheets

(56) References Cited

U.S. PATENT DOCUMENTS

2005/0234891 A1* 10/2005 Walther et al. .................. 707/3
2006/0053145 A1* 3/2006 Salminen et al. ............ 707/102
2006/0064482 A1* 3/2006 Nybo ............................ 709/224
2006/0095586 A1* 5/2006 Adelman et al. ............. 709/245
2006/0122972 A1 6/2006 Keohane et al.

OTHER PUBLICATIONS

"U.S. Appl. No. 11/002,546 Office Action", Mar. 19, 2007, 14 pages.

* cited by examiner

ADMINISTRATION OF SEARCH RESULTS

RELATED APPLICATIONS

This application is a continuation application that claims the benefit of U.S. application Ser. No. 11/002,546 filed Dec. 2, 2004.

BACKGROUND

Embodiments of the inventive subject matter generally relate to the field of data processing, or, more specifically, administration of search results.

Often when a user is doing a web search via a search engine, such as the Google search engine, the Yahoo! search engine, or the Ask Jeeves search engine, many search results link to the same web site or even the same web page. Such duplicate search results occur because the same search keywords occur more than once on the same web page or web site. Such duplicate search results may yield inefficiencies in searching because many of the search results in a set of search results displayed on several screens of data from the same search may represent links to sites or pages already visited and found to be of no interest.

SUMMARY

Embodiments include a method for administering search results that comprises displaying a set of search results from a web search, each search result indicating a link to a web page. Responsive to selection of a first of the set of search results for exclusion from display, a subset of one or more of the set of search results that indicate related links is identified. The related links comprise links have a same domain name as the link of the first search result. The first search result and the subset of the set of search results are excluded. The search results are displayed without the excluded ones of the set of search results.

Embodiments include a method for administering search results that comprises identifying a subset of one or more of a set of search results that indicate related links responsive to selection of a first of the set of search results on a web page displaying the set of search results from a search. The related links comprise links having a same domain name as the link of the first search result. All of the set of search results except the first search result and the subset of the set of search results are excluded. The first search result and the subset of the set of search results are displayed.

BRIEF DESCRIPTION OF THE DRAWINGS

The present embodiments may be better understood, and numerous objects, features, and advantages made apparent to those skilled in the art by referencing the accompanying drawings.

FIG. 6 depicts a first screen of search results, and FIG. 7 depicts a second screen in the same set of search results.

DESCRIPTION OF EMBODIMENT(S)

Figure 1A:
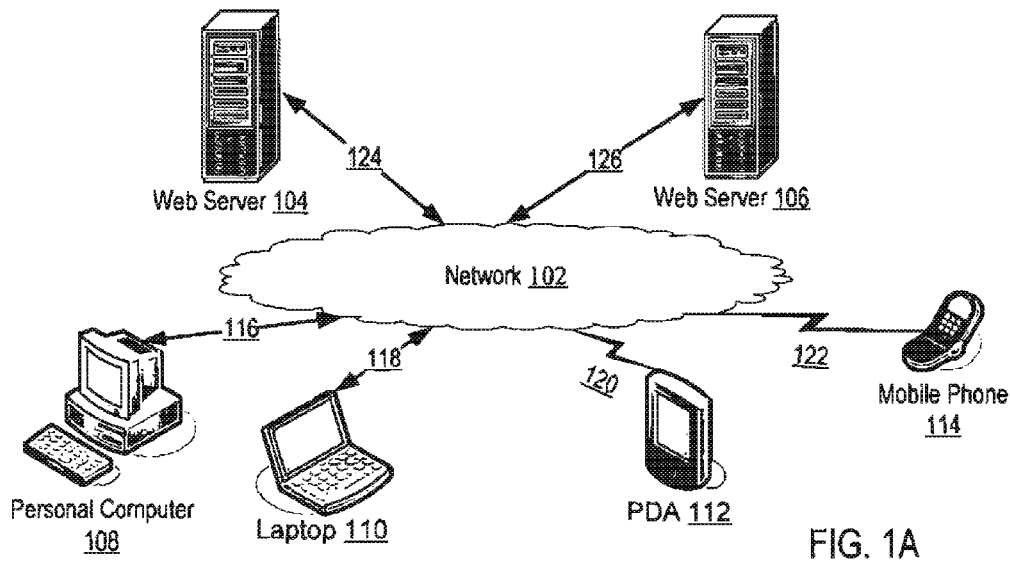
FIG. 1A sets forth a network diagram illustrating an exemplary system for administration of search results according to embodiments of the present invention.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Introduction

The present invention is described to a large extent in this specification in terms of methods for administration of search results. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Glossary of Terms

Subject to the actual context in which they are used, the following terms are used generally in this specification as defined here:

"Anchor element" refers to a markup language element that identifies and implements a 'link' or 'web link' or 'hyperlink.' Links are the basic hypertext construct, the central function of the web. A common example form of an anchor element is: <a href="\\SrvrX\DocY">Press Here For Document Y</a>

This example anchor element includes a start tag <a>, and end tag <\a>, an href attribute that identifies the target of the link as a document named 'DocY' on a web server named 'SrvrX,' and an anchor. The "anchor" is the display text that is set forth between the start tag and the end tag. That is, in this example, the anchor is the text "Press Here For Document Y." In typical usage, the anchor is displayed in highlighting, underscored, inverse, specially colored, or some other fashion setting it apart from other screen text and identifying it as an available hyperlink. In addition, the screen display area of the anchor is sensitized to user interface operations such as GUI pointer operations such as mouseclicks. In typical operation, a user points to the anchor with a mouse pointer or other GUI pointer, clicks on the anchor to invoke the link, and the browser then retrieves and displays Document Y from server SrvrX. The "anchor element" is the entire markup from the start tag to the end tag.

"Browser," as the term is used in this specification, generally means a web browser, a software application for locating, requesting, retrieving, and displaying computer resources in the form of static or dynamic web pages or server-side scripting output. That is, a browser is a data communications application that requests web pages, receives them across a network in accordance with a data communications protocol, and displays them on a computer display screen. The data communications protocol may be HTTP, HDTP, WAP, and others as will occur to those of skill in the art. The web pages may be static pages expressed in HTML, HDML, WML, and in other forms as will occur to those of skill in the art. The web pages may be generated dynamically from JSPs, ASPs, CGI scripts, and from other dynamic server page technologies as will occur to those of skill in the art. Web pages may include graphic images, video clips, audio clips, text, markup tags, and so on.

Browsers typically comprise both a web page display routines and a data communications client capable of communications in a protocol supporting markup languages, HTTP, HDTP, WAP, and so on. Browsers today typically can display text, graphics, audio and video. Browsers are operative in any computer capable of data communications including web-enabled devices, wireless web-enabled devices, microcomputers, PDAs, laptops, and so on. Browsers in wireless web-enabled devices often are downsized browsers called "microbrowsers." Browsers typically support not only HTML (the 'HyperText Markup Language'), but other markup languages as well, including for example, XML (the 'eXtensible Markup Language'), and, in the case of wireless web-enabled devices, WML (the 'Wireless Markup Language') and HDML (the 'Handheld Device Markup Language').

CGI means "Common Gateway Interface," a standard technology for data communications of resources between web servers and web clients. More specifically, CGI provides a standard interface between servers and server-side 'gateway' programs which administer actual reads and writes of data to and from files systems and databases. The CGI interface typically sends data to gateway programs through environment variables or as data to be read by the gateway programs through their standard inputs. Gateway programs typically return data through standard output. It is typically a gateway program that provides a MIME type in a return message header advising a server, and eventually therefore a browser or other communications client, of the type of data returned from CGI gateway programs.

A "hyperlink," also referred to as "link" or "web link" is a reference to a resource name or network address which when invoked allows the named resource or network address to be accessed. Often the hyperlink identifies a network address at which is stored a web page. As used here, "hyperlink" is a broader term than "HTML anchor element." Hyperlinks include links effected through anchors as well as URIs invoked through 'back' buttons or 'forward' buttons on browsers, which do not involve anchors. Hyperlinks include URIs typed into address fields on browsers and invoked by a 'Go' button, also not involving anchors. In addition, although there is a natural tendency to think of hyperlinks as retrieving web pages, their use is broader than that. In fact, hyperlinks access "resources" generally available through hyperlinks including not only web pages but many other kinds of data and server-side script output as well.

"Network" is used in this specification to mean any networked coupling for data communications among computers or computer systems. Examples of networks useful with the invention include intranets, extranets, internets, local area networks, wide area networks, and other networks as will occur to those of skill in the art.

"Resource" means any aggregation of information administered over networks by various embodiments of the present invention. Network communications protocols generally, for example, HTTP, transmit resources, not just files. A resource is an aggregation of information capable of being identified by a URL or URL. In fact, the 'R' in 'URL' is 'Resource.' The most common kind of resource is a file, but resources include dynamically-generated query results, the output of a CGI scripts, Java servlets, dynamic server pages, Java server pages, documents available in several languages, and so on. It may sometimes be useful to think of a resource as similar to a file, but more general in nature. Files as resources include web pages, graphic image files, video clip files, audio clip files, files of data having any MIME type, and so on. As a practical matter, most HTTP resources are currently either files or server-side script output. Server side script output includes output from CGI programs, Java servlets, Active Server Pages, Java Server Pages, and so on.

"Server" in this specification refers to a computer or device comprising automated computing machinery on a network that manages network resources. A "web server" in particular is a server that communicates with browsers by means of data communications protocols supporting hyperlinks, HTTP, HDTP, WAP, and so on, for example.

A "URL" or "Universal Resource Locator" is an identifier of a named object in any namespace accessible through a network. URLs are functional for any access scheme, including for example, the File Transfer Protocol or "FTP," Gopher, and the web. A URL as used in typical embodiments of the present invention usually includes an internet protocol address or a domain name that resolves to an internet protocol address. The internet protocol address identifies a location where a resource, particularly a web page, static or dynamic, a CGI script, or a servlet, is located on an internet, a network that uses the Internet Protocol as its network layer data communications protocol. URLs directed to particular resources, such as particular HTML files, JPEG files, or MPEG files, typically include a path name or file name locating and identifying a particular resource in a file system coupled to a network. To the extent that a particular resource, such as a CGI file or a servlet, is executable, for example to store or retrieve data, a URL often includes query parameters, or data to be stored, in the form of data encoded into the URL. Such parameters or data to be stored are referred to as 'URL encoded data.'

"World Wide Web," or more simply "the web," refers to a system of internet protocol ("IP") servers that support specially formatted documents, documents formatted in markup languages such as HTML, XML, WML, or HDML.

The term "Web" is used in this specification also to refer to any server or connected group or interconnected groups of servers that implement data communications protocols in support of URLs and documents in markup languages, including, for example, the HyperText Transport Protocol ("HTTP"), the Handheld Device Transport Protocol ("HDTP"), the Wireless Access Protocol ("WAP"), and so on as will occur to those of skill in the art.

Administration of Search Results

Exemplary methods, systems, and products for administration of search results according to embodiments of the present invention are described with reference to the accompanying drawings, beginning with FIG. 1A. FIG. 1A sets forth a network diagram illustrating an exemplary system for administration of search results according to embodiments of the present invention. The system of FIG. 1A operates generally to administer search results according to embodiments of the present invention by displaying on a browser a set of search results from a web search (where each search result contains a link to a web page), selecting a search result for exclusion from display (including selecting for exclusion from display search results containing related links), and displaying the search results without the selected search result and without the search results containing related links.

The system of FIG. 1 includes four devices that support browsers: personal computer (108), laptop computer (110), PDA (112), and mobile phone (114). These four devices are coupled for data communications with web servers (104, 106) through network (102). Web servers (104, 106) are coupled to network (102) through wireline connections (124, 126) respectively. A web server (104, 106) is a computer that transmits web pages across a network in response to requests from browsers in accordance with a data communications protocol. Network-enabled mobile phone (114) connects to network (102) through wireless connection (122), and PDA (112) connects to network (102) through wireless connection (120). In the example of FIG. 1, personal computer (108) connects through wireline connection (116) to network (102), and laptop (110) connects through wireline connection (118) network (102). In the system of FIG. 1, exemplary devices (108, 110, 112, 114) each supports a browser improved to administer search results according to embodiments of the present invention. Examples of browsers that may be improved to administer search results according to embodiments of the present invention include Internet Explorer™, Netscape Communicator™, Mozilla™, and Firefox™.

The network connection aspect of the system of FIG. 1A is only for explanation, not for limitation. Systems for administration of search results according to embodiments of the present invention are not limited to four client devices (108, 110, 112, 114), nor to two web servers (104, 106), but in fact may include any number of client devices and web servers. In addition, the arrangement of servers and other devices making up the exemplary system illustrated in FIG. 1A are for explanation, not for limitation. Data processing systems for administration of search results according to embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1. Moreover, systems for administration of search results according to embodiments of the present invention may be connected as LANs, WANs, intranets, internets, the Internet, webs, the World Wide Web itself, or other network arrangements as will occur to those of skill in the art. Such networks are media that may be used to provide data communications connections between various devices and computers connected together within an overall data processing system.

'Browser,' as the term is used in this specification, generally means a web browser, a software application for locating, requesting, retrieving, and displaying computer resources in the form of static or dynamic web pages, including server-side scripting output. For further explanation, FIG. 1B sets forth a block diagram of a browser (142) capable of administering search results according to embodiments of the present invention. Browser (142) includes display routines in a display module (128) and a data communications module (132). Browser (142) may display text, graphics, audio, and video.

Figure 1B:
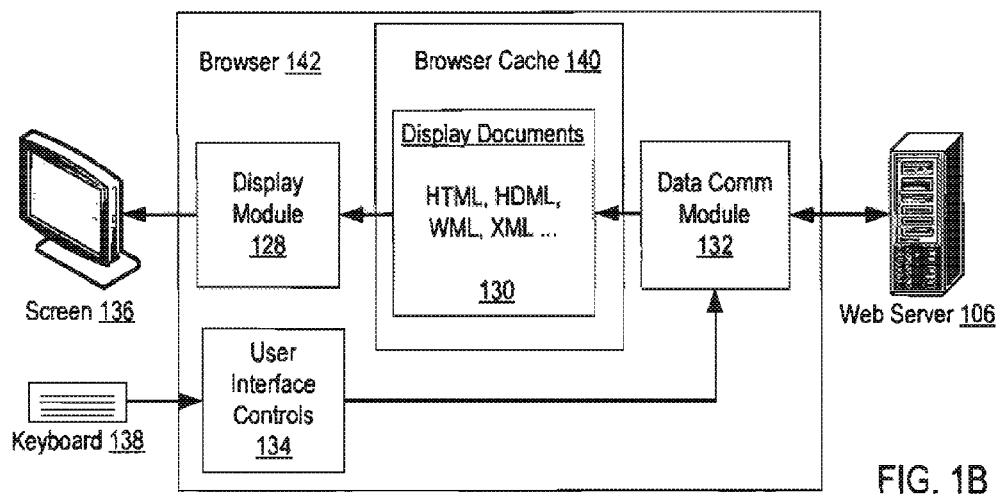
FIG. 1B sets forth a block diagram of a browser capable of administering search results according to embodiments of the present invention.

The browser of FIG. 1B operates generally to administer search results according to embodiments of the present invention by displaying on a browser screen (136) a set of search results from a web search (where each search result contains a link to a web page), selecting a search result for exclusion from display (including selecting for exclusion from display search results containing related links), and displaying the search results without the selected search result and without the search results containing related links. Browser (142) includes user interface controls (134) capable of accepting user input from a keyboard (138), mouse (not shown), and other user input devices. Browser (142) selects a search result for exclusion from display according to user input through a user input device. Browser (142) includes a browser cache (140), a region of computer memory where the browser stores retrieved web pages for display.

Browser (142) may be implemented or configured to administer search results according to embodiments of the present invention in any automated device capable of data communications including web-enabled devices, wireless web-enabled devices, microcomputers, PDAs, laptops, mobile phones, and so on. Browsers in wireless web-enabled devices often are downsized browsers called "microbrowsers." Browsers may support not only HTML (the 'HyperText Markup Language'), but other markup languages as well, including for example, XML (the 'eXtensible Markup Language'), and, in the case of wireless web-enabled devices, WML (the 'Wireless Markup Language') and HDML (the 'Handheld Device Markup Language').

Administration of search results in accordance with the present invention is generally implemented with automated devices, that is, with automated computing machinery, referred to generally as 'computers.' In the system of FIG. 1A, for example, all the illustrated devices are implemented to some extent at least as computers. For further explanation, therefore, FIG. 2 sets forth a block diagram of automated computing machinery comprising an exemplary computer (152) capable of administration of search results according to embodiments of the present invention. Computer (152) of FIG. 2 includes at least one computer processor (156) or 'CPU' as well as random access memory (168) ("RAM") which is connected through a system bus (160) to processor (156) and to other components of the computer.

Figure 2:
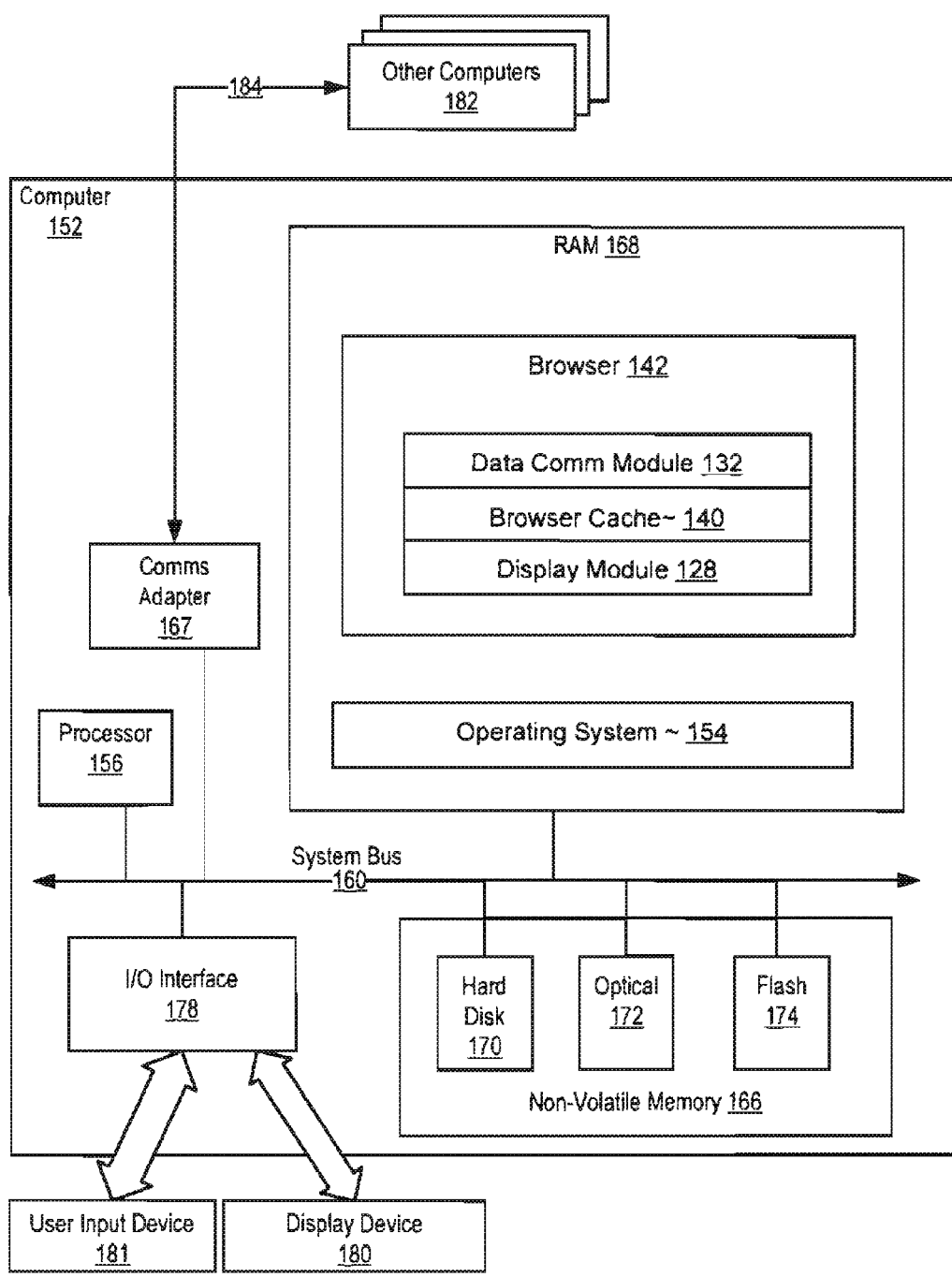
FIG. 2 sets forth a block diagram of automated computing machinery comprising an exemplary computer capable of administration of search results according to embodiments of the present invention.

Stored in RAM (168) is a browser (142) that includes a data communications module (132), a browser cache (140), and a display module (128). The browser and its modules as illustrated in FIG. 2 are computer program instructions for requesting, receiving, and displaying web pages. The browser includes computer program instructions that administer search results according to embodiments of the present invention. Also stored in RAM (168) is an operating system (154). Operating systems useful in computers according to embodiments of the present invention include UNIX™, Linux™, Microsoft NT™, AIX™, and many others as will occur to those of skill in the art. Operating system (154) and browser (142) in the example of FIG. 2 are shown in RAM (168), but components of such software may be stored in non-volatile memory (166) also.

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182) including, for example, web servers. Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 3:
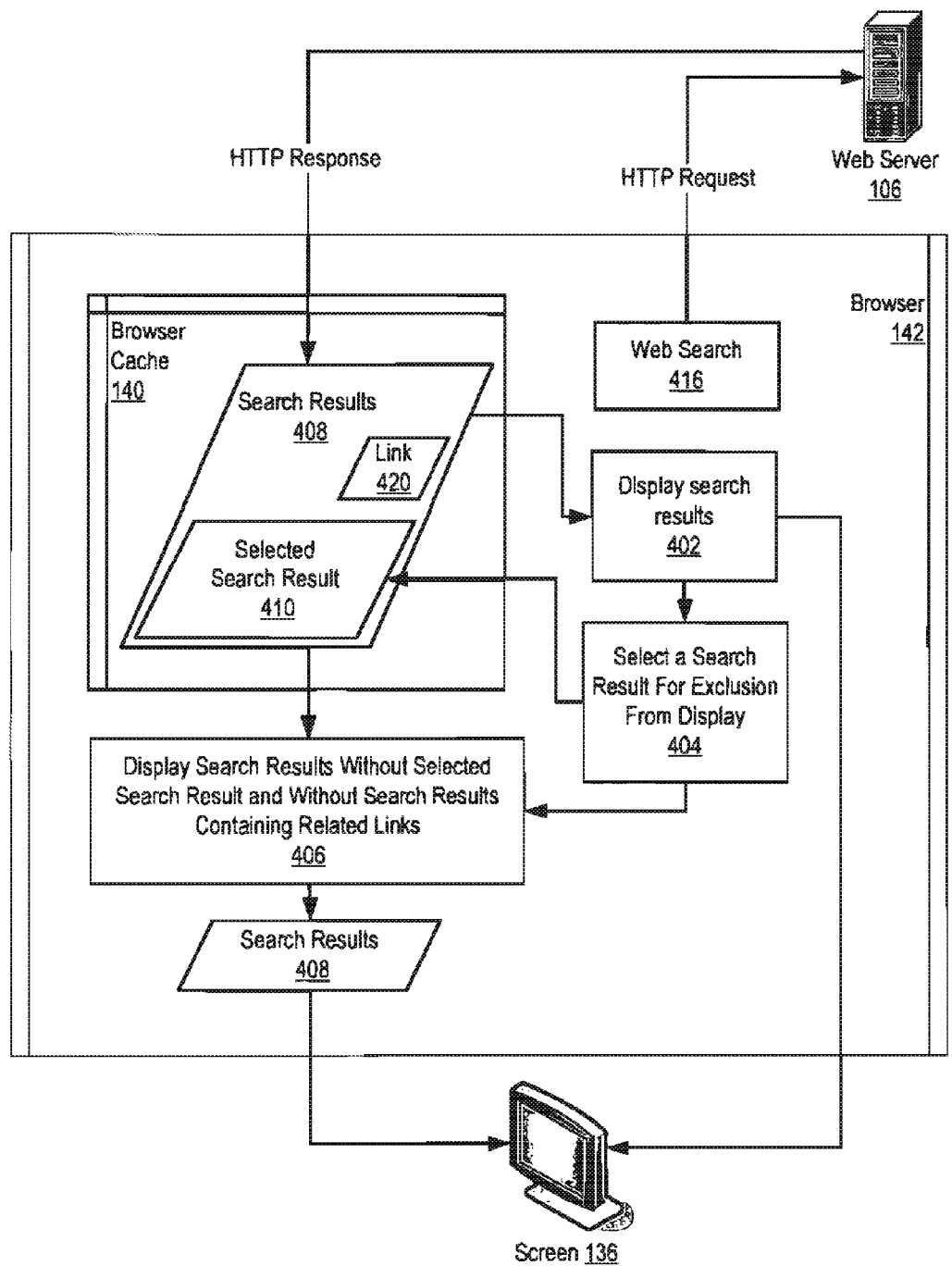
FIG. 3 sets forth a flow chart illustrating an exemplary method for administration of search results according to embodiments of the present invention FIG. 4 sets forth a flow chart illustrating an exemplary method of selecting a search result

For further explanation, FIG. 3 sets forth a flow chart illustrating an exemplary method for administration of search results according to embodiments of the present invention that includes displaying (402) by a browser (142) a set of search results (408) from a web search, each search result containing a link to a web page. Each link may be represented in a web page by a markup element that includes a reference to another web page. In HTML, for example, the links are represented by anchor elements <a></a> that include href parameters whose values are URLs. The URL have the form: www.domain_name, where www types the URL as a reference to a web page and domain_name is a domain name that includes one or more dotted qualifiers such as .com, .net, org, and so on.

The method of FIG. 2 also includes selecting (404) a search result for exclusion from display, thereby identifying a selected search result (410). Selecting a search result for exclusion may be carried out by a user's operating a user interface to identify a search result to be excluded. In the method of FIG. 3, selecting a search result for exclusion from display includes selecting for exclusion from display search results containing related links. The method of FIG. 3 also includes displaying (406) the search results (408) without the selected search result and without the search results containing related links.

In this example, related links are links related to the link (420) in the selected search result Links are related according to domain name; links containing the same domain name are related. The link represented by the URL 'www.ibm.com,' for example, is related to the link 'www.ibm.com/us/.' The link 'www.ebay.com' is related to the link 'www.ebay.com/myebay/.' The link 'www.ebay.com/myebay/' is related to the link 'www.ebay.com/search/.' And so on.

Figure 4:
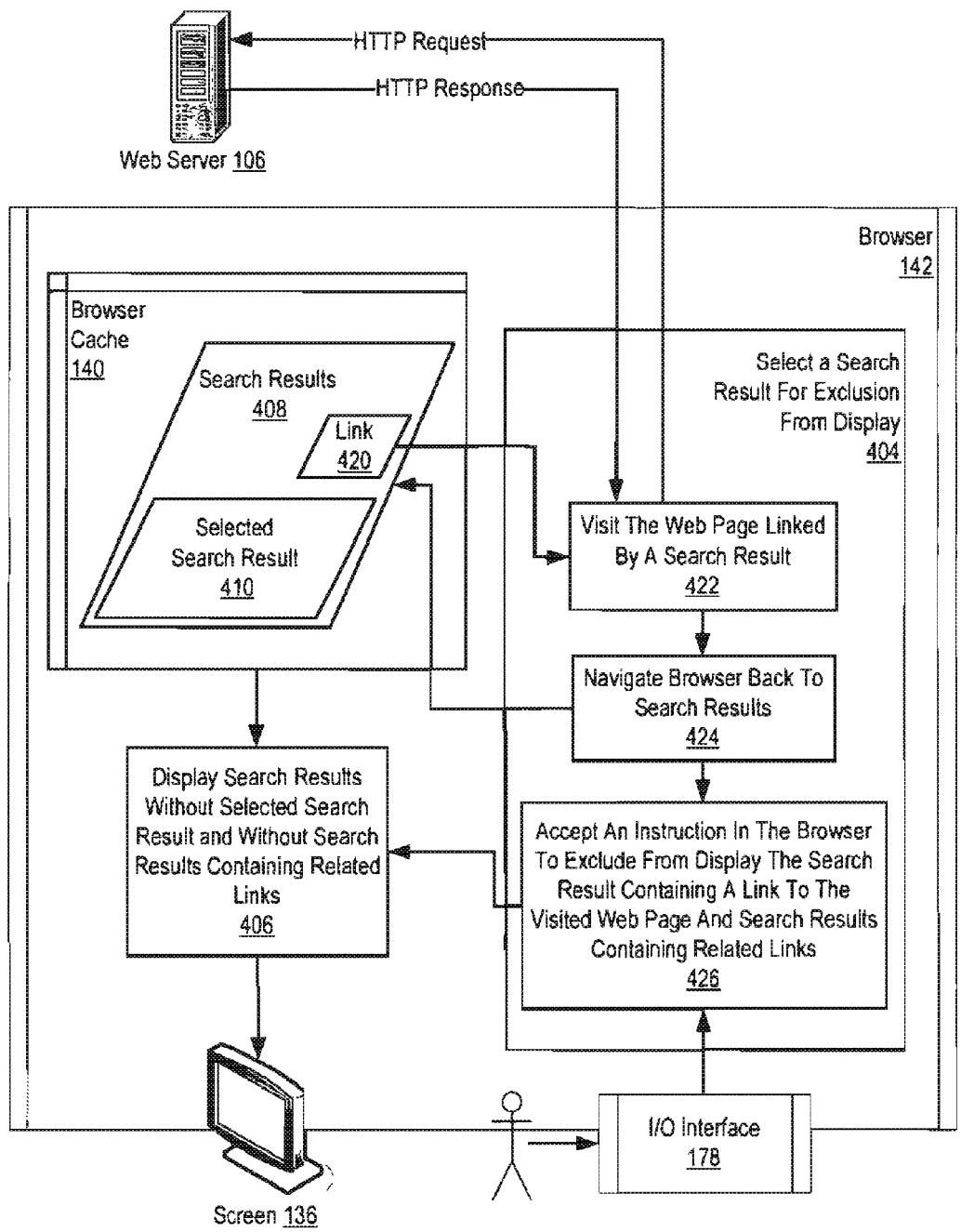

For further explanation, FIG. 4 sets forth a flow chart illustrating an exemplary method of selecting (404) a search result that includes visiting (422) on the browser the web page linked by a search result, navigating (424) the browser back to the search results, and accepting (426) an instruction in the browser to exclude from display the search result containing a link to the visited web page and search results containing related links. The method of FIG. 4 is explained in more detail with reference to FIG. 5.

Figure 5:
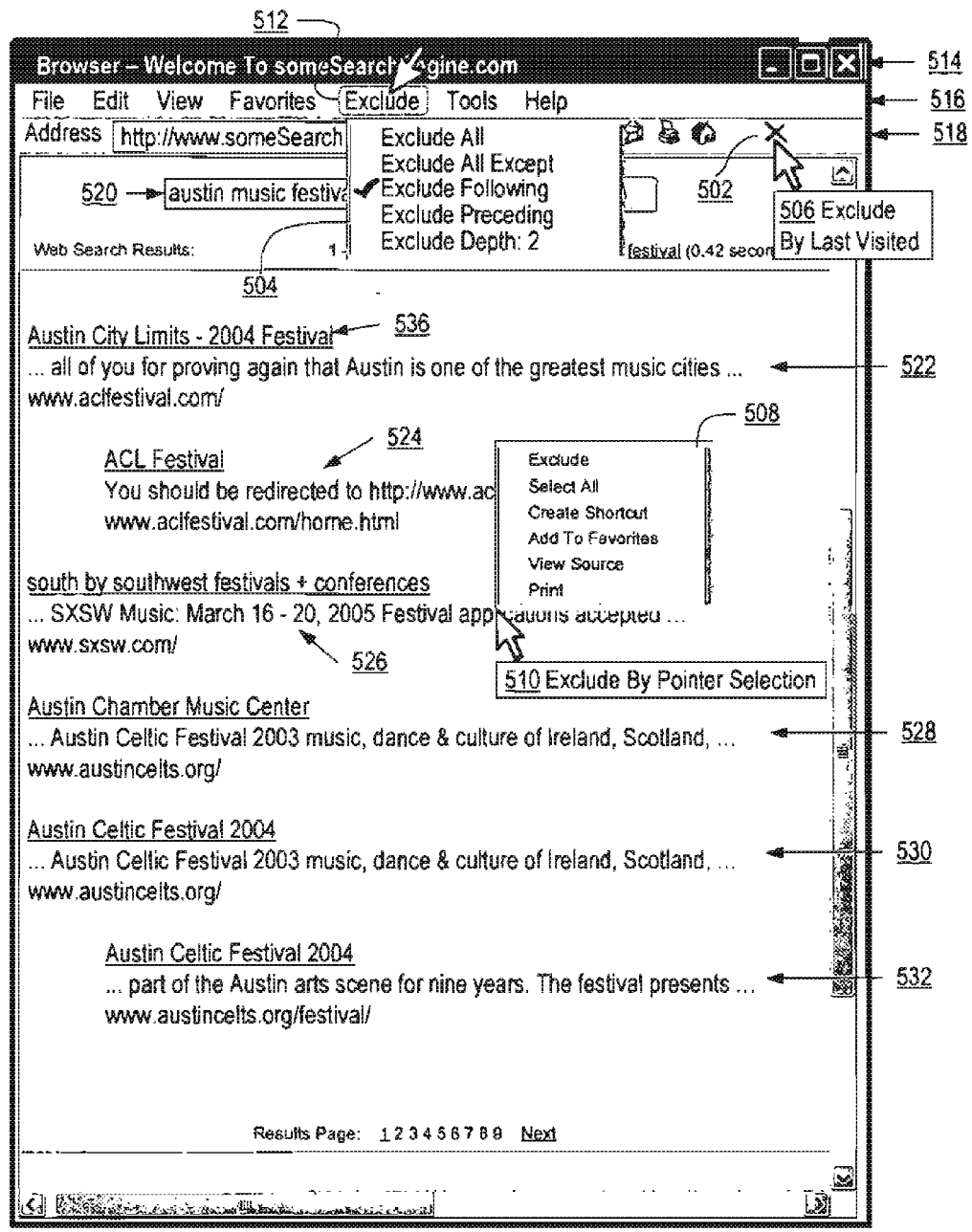
FIG. 5 depicts a graphical user interface ('GUI') of an exemplary software application program, more particularly, in the example of FIG. 5, a browser.

FIG. 5 depicts a graphical user interface ('GUI') of an exemplary software application program, more particularly, in the example of FIG. 5, a browser. The browser of FIG. 5 is an example of a computer software product improved to administer search results according to embodiments of the present invention, that is, programmed at the source code level or modified with a plug-in, to display a set of search results from a web search (416 on FIG. 3), select a search result for exclusion from display (including selecting for exclusion from display search results containing related links), and display the search results without the selected search result and without the search results containing related links.

The browser of FIG. 5, as depicted, has been operated to point to a web site named "someSearchEngine.com," as shown in the title bar of the browser display (514). The browser of FIG. 3 also includes a horizontal menu (516) containing menu items named: File, Edit, View, Favorites (called 'Bookmarks' on some browsers), Exclude, Tools, and Help. The browser of FIG. 5 includes a GUI toolbar (518) with a Back button, a Forward button, and buttons for refreshing the display, emailing the display, printing the display, and returning to a home page configured in the browser. The toolbar buttons are better viewed on FIGS. 6 and 7 where they are not obscured by pull-down menu (504). The exemplary browser of FIG. 5 includes an address bar (520) for use in browser navigation.

The browser of FIG. 5 has been operated to request of the search engine search results for the query 'austin music festival.' Several search results (522-532) are displayed on the browser screen. Each search result includes an anchor, some sample text from the web site linked to the search result, and a URL that links the search result to a web page. In search result (522), for example, the anchor is "Austin City Limits—2004 Festival," the sample text is " . . . all of you for proving again that Austin is one of the greatest music cities . . . ," and the URL is www.aclfestival.com/.

A 'link' is a reference to a URL which when invoked requests access to a resource identified by the URL. The term 'link' in this specification includes links to URLs effected through anchor elements, address bars like the one at reference (520), as well as 'Back' and 'Forward' buttons on a toolbar (518) of a browser. An anchor element is a markup language element that identifies and implements a hyperlink. An exemplary form of an anchor element, here expressed in HTML, is: TABLE-US-00001<a href="www.aclfestival.com/index.html">Austin City Limits—2004 Festival</a>

This example anchor element includes a start tag <a>, and end tag </a>, an href attribute that identifies the target of the link as a web page document named 'index.html' on a web server named 'aclfestival.com,' and an anchor. The "anchor" is the display text that is set forth between the start tag and the end tag. That is, in this example, the anchor is the text "Austin City Limits—2004 Festival." The anchor often is displayed in highlighting, underscored, inverse, specially colored, or some other fashion setting it apart from other screen text and identifying it as an available hyperlink. In addition, the screen display area of the anchor is sensitized to user interface operations such as GUI pointer operations such as mouseclicks. A user may point to the anchor with a mouse pointer or other GUI pointer, click on the anchor to invoke the link, and the browser then retrieves and displays the web page 'index.html' from server aclfestival.com. The 'anchor element' is the entire markup from the start tag to the end tag. In the example of FIG. 53, search result (522) is depicted with anchor "Austin City Limits—2004 Festival," and search result (524) is depicted with anchor "ACL Festival."

In addition to the other button on toolbar (518), the toolbar on the browser of FIG. 5 includes a button (502) that supports selecting a search result according to the method of FIG. 4. That is, the browser of FIG. 5 is programmed to operate in response to a user's invoking button (502) after visiting the web page linked by a search result and navigating the browser back to the search results, to accept the user's invoking button (502) as an instruction to exclude from display the search result containing a link to the visited web page and search results containing related links. A user may, for example, visit the web page linked by search result (530), www.austincelts.org, navigate the browser back to the search results by mouse-clicking its Back button, and invoke button (502)—in response to which the browser is programmed to exclude from display the search result (530) containing a link to the visited web page as well as the search result (532) containing the related link www.autsincelts.org/festival/.

The browser may display the search results without the selected search result and without the search results containing related links by locating the search results to be excluded in a cached web page, commenting them out, and then re-displaying or refreshing the web page display. In the example of visiting www.austincelts.org, when button (502) is invoked to 'Exclude By Last Visited' (506), the browser implements a text search through its browser cache (140 on FIG. 1) for the anchor text, the URL, the sample text from the linked web page, or any combination of these, comments out the entire search result, and refreshes the display, thereby excluding the search result just commented out.

Commenting out a search results is implemented by inserting comment marks in the web page containing the search result. HTML comment marks, for example, have the following syntax: TABLE-US-00002<!--this is a comment--><!--and so is this one, which occupies more than one line-->

That is, HTML comments are a markup tag that includes an open delimiter "<!" and a close delimiter ".fwdarw.". Information that appears inside a comment tag is ignored by the browser. The web page in the cache containing the illustrated search results may contain the following HTML markup for search result (530): TABLE-US-00003<a href="www.austincelts.org/index.html">Austin Celtic Festival 2004</a><p> . . . Austin Celtic Festival 2003 music, dance & culture of, Ireland, Scotland, . . . <p> www.austincelts.org/

Upon finding this segment of HTML for search result (530), the browser may comment it out by inserting comment marks (<!--.fwdarw.) around it, so that it appears as follows: TABLE-US-00004<!--<a href="www.austincelts.org/index.html">Austin Celtic Festival 2004</a><p> . . . Austin Celtic Festival 2003 music, dance & culture of, Ireland, Scotland, . . . <p>www.austincelts.org/

Upon refreshing the display, the browser's display module (128 on FIG. 1) now will ignore this search result entirely. Search results behind the excluded search result are moved up automatically by the browser's display module so that no blank space is left on the screen where the excluded search result would have been displayed.

It is convenient to have a way to instruct the browser to exclude search results according to a last-visited web page because a user may often decide that the related search results and search results bearing related links are of no interest while visiting such a web page. That is, it is visiting the web page that helps to decide to exclude certain search results. On the other hand, the user may be able to determine from the sample text in a search result or may be able to determine otherwise, without visiting a web page, that the user has no interest in search results for that page or related pages. The browser of FIG. 5 therefore provides an alternative method for selecting a search result for exclusion from display, including selecting for exclusion from display search results containing related links, with no need to first visit the web page linked by a search result and navigate the browser back to the search results.

The browser of FIG. 5 is programmed to display pop-up menu (508) in response to a right mouse-click while the mouse pointer is over a search result. In the illustrated example, mouse pointer (510) has been right-clicked over search result (526) to display pop-up menu (508). The first menu item on pop-up menu (508) is named "Exclude," and the explanatory tooltip text for mouse pointer (510) is "Exclude By Pointer Selection." The browser in this example is programmed to operate in response to the selection of the menu item named "Exclude" by excluding from display the search result (526) that the mouse pointer is over. The browser may display the search results without the selected search result and without the search results containing related links by locating the search results to be excluded in a cached web page, commenting them out as described above, and then re-displaying or refreshing the web page display.

The example browser of FIG. 5 includes a top-level horizontal menu item named "Exclude" (512). Invoking menu item (512) displays pop-down menu (504) whose menu items implements alternative ways of selecting search results for exclusion. Invoking "Exclude All" on pop-down menu (504) configures the browser to select for exclusion from display all search results that contain related links, including the selected search result. Invoking "Exclude All Except" on pop-down menu (504) configures the browser to select for exclusion from display all search results that contain related links except the selected search result. Invoking "Exclude Following" on pop-down menu (504) configures the browser to select for exclusion from display only search results that contain related links and follow a selected search result in the set of search results. Invoking "Exclude Preceding" on pop-down menu (504) configures the browser to select for exclusion from display only search results that contain related links and precede a selected search result in the set of search results.

Invoking "Exclude Depth" on pop-down menu (504) prompts the user to specify a depth and configures the browser to select for exclusion from display only search results that contain links to web pages located above the specified depth in a hierarchy of web pages in the web site linked by the selected search result. Setting the Exclusion Depth to a large value, or invoking "Exclude All" on pull-down menu (504) may configure the browser to select for exclusion from display all search results containing links to web pages in the web site linked by the selected search result. Setting the depth to '1' may configure the browser to select for exclusion from display only search results containing the same link that is in the selected search result. The menu items of pull-down menu (504) may be invoked singly or in various combinations as may occur to those of skill in the art.

"Exclude Depth" refers to how deep into a URL pathway an exclusion is effected. For example, there may be three URLs: TABLE-US-00005 www.ibm.com/search/mouse_pad.html www.ibm.com/retrieve/dbase.html www.ibm.com/retrieve/objbase.html An Exclude Depth of "1" means that first string of characters leading up to the next "/" would be the characters needed to match to exclude. An Exclude Depth of "2" would imply that the first string of characters and second string of characters leading up the to the next "/", with sets of strings delimited by "/", would be the characters needed to match to exclude. Thus, if the user selected for exclusion a search result linked by the URL "www.ibm.com/retrieve/objbase.html" and chose an Exclude Depth of "1", search results linked by all three of the above example URLs would be commented out in the browser cache and excluded from display. If, however, the user chose an Exclude Depth of "2", then only search results linked by the URLs with dbase.html and objbase.html would be excluded as the URL "www.ibm.com/search" fails to match the exclusion parameters when the second string "search" fails to match "retrieve".

Figure 6:
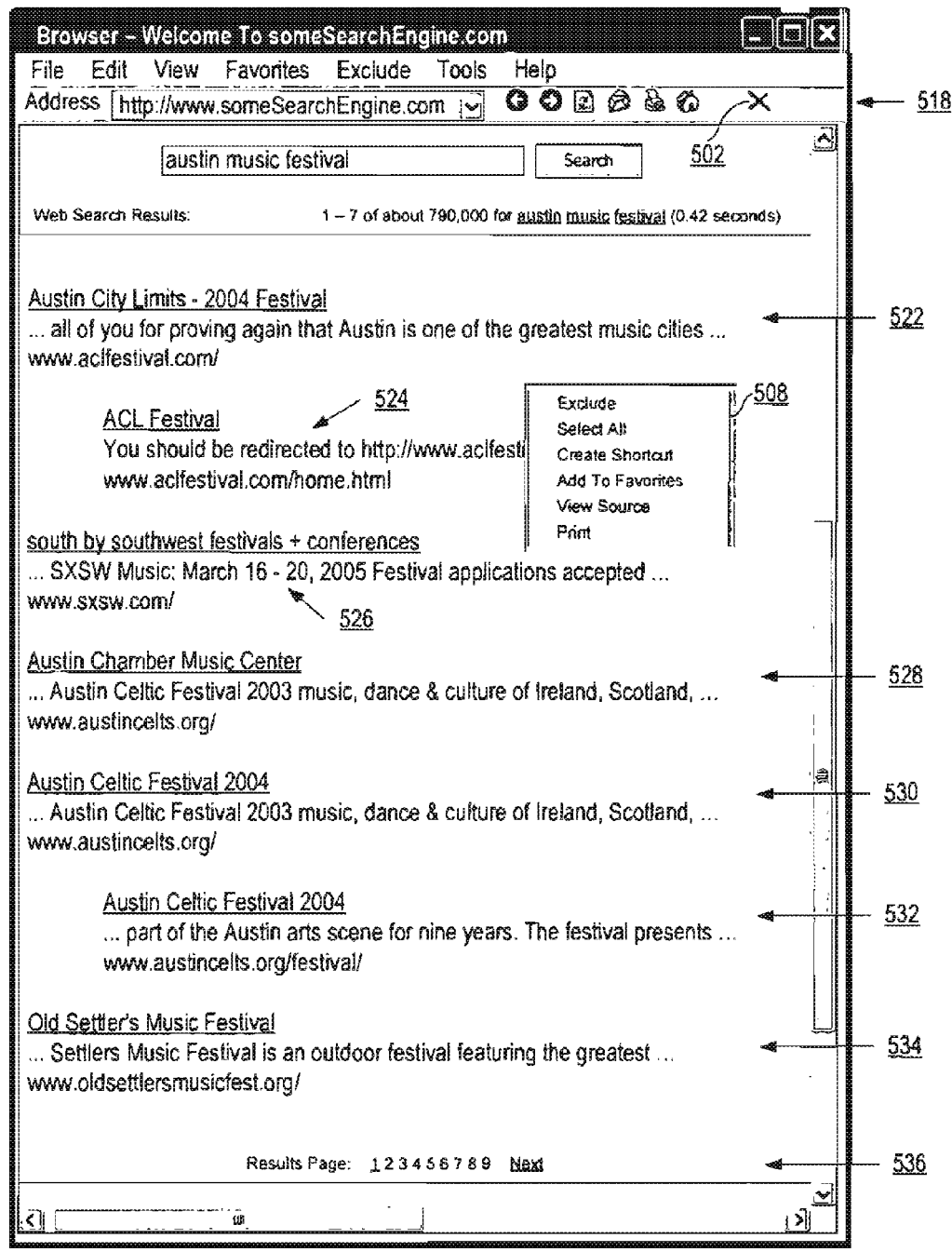
FIGS. 6 and 7 illustrate two related browser screens on the same browser described regarding FIG. 5.
Figure 7:
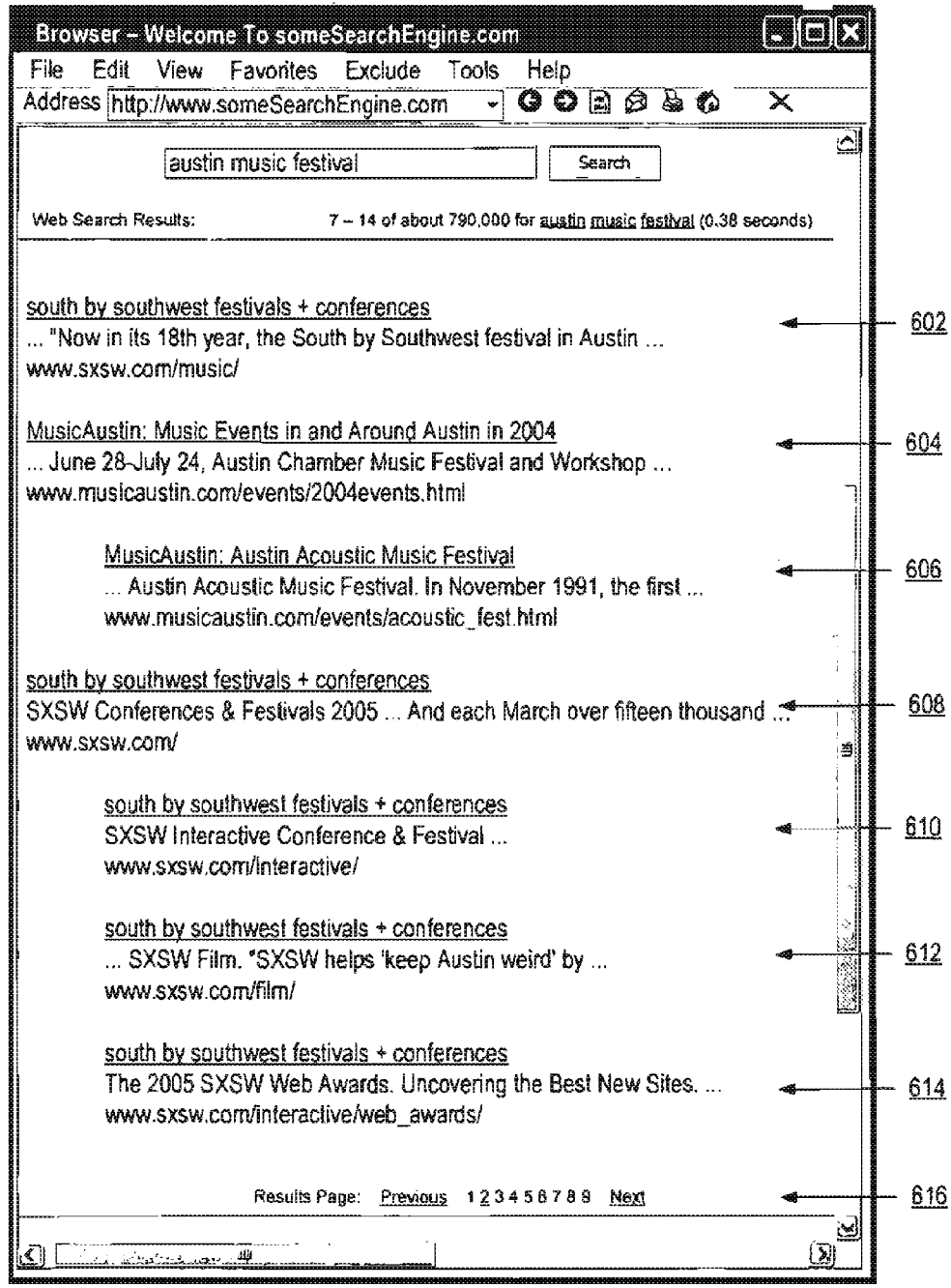

For further explanation, server use cases are explained with reference to FIGS. 6 and 7. FIGS. 6 and 7 illustrate two related browser screens on the same browser described above regarding FIG. 5. The browser has been navigated to someSearchEngine.com and the search engine at someSearchEngine.com has been queried with "austin music festival." The search engine identified about 790,000 search results and, according to the results line (536), returned enough search results to fill nine browser screens. As shown in the results lines (536, 616), FIG. 6 depicts the first screen of search results, and FIG. 7 depicts the second. Browser configuration is set by the use of a pull-down menu like the one shown at reference (504) on FIG. 5. Invoking a menu item on the pull-down menu to set a configuration parameter is referred to as 'setting' the parameter. A user may select a search result for exclusion on this example browser either by visiting the web page linked by the search result, returning to the search results screen, and invoking button (502)—or by right-clicking on a search result and invoking the "Exclude" option on pop-up menu (508). Here are several exemplary use cases:

A user sets the configuration parameter "Exclude All" and selects search result (608) for exclusion. The browser refreshes the screens without search results (526, 602, 608, 610, 612, 614), sliding search results up from subsequent screens to fill the empty space left by the exclusions.

A user sets the configuration parameter "Exclude All Except" and selects search result (608) for exclusion. The browser leaves search result (608) on display and refreshes the screens without search results (526, 602, 610, 612, 614), sliding search results up from subsequent screens to fill the empty space left by the exclusions. A user sets the configuration parameter "Exclude Following" and selects search result (610) for exclusion. The browser refreshes the screens without search results (612, 614), sliding search results up from subsequent screens to fill the empty space left by the exclusions.

A user sets the configuration parameter "Exclude Preceding" and selects search result (612) for exclusion. The browser refreshes the screens without search results (526, 602, 608, 610), sliding search results up from subsequent screens to fill the empty space left by the exclusions.

A user sets the configuration parameter "Exclude Depth" to '1' and selects search result (602) for exclusion. The browser refreshes the screens without search results (526, 608), sliding search results up from subsequent screens to fill the empty space left by the exclusions.

A user sets the configuration parameter "Exclude Following," sets the configuration parameter "Exclude Depth" to '2,' and selects search result (610) for exclusion. The browser refreshes the screens without search result (612), sliding a search result up from a subsequent screen to fill the empty space left by the exclusion.

In view of the explanation set forth above in this specification, readers by now will understand that the benefits of administering search results according to embodiments of the present invention include:

Web searching is made more powerful because screen displays of search results are more concentrated with search results of interest, uninteresting search results being easily excluded with just a few keystrokes or mouse-clicks.

Searches are clearly, more meaningful, less confused. The prior art practice of highlighting previously search results that link to previously visited web sites is ambiguous. It provides no indication whether a previously visited web site was of interest to a searcher. Thus a user may visit a web site of no interest more than once because by the time the user is on the fourth screen of search results, the user can no longer remember why a particular search result is highlighted. Administration of search results according to embodiments of the present invention, however, is unambiguous. Search results of interest continue to appear on display. Search results not of interest are excluded from display.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

While the embodiments are described with reference to various implementations and exploitations, it will be understood that these embodiments are illustrative and that the scope of the inventive subject matter is not limited to them. In general, techniques for excluding search results as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for administration of search results, the method comprising:

displaying a set of search results from a web search, each search result indicating a link to a web page;

responsive to selection of a first of the set of search results for exclusion from display, identifying a subset of one or more of the set of search results that indicate related links, wherein the related links comprise links having a same domain name as the link of the first search result, and determining that the links of the subset of the set of search results match the link of the first search result up to a specified depth in the uniform resource locator pathway;

excluding the first search result and the subset of the set of search results; and displaying the search results without the excluded ones of the set of search results;

wherein said determining that the links of the subset of the set of search results match the link of the first search result up to a specified depth in the URL pathway comprises determining that the uniform resource locators of the links of the subset of the search results match the uniform resource locator of the link of the first search result up to a specified number of pathway delimiters, wherein the specified number of pathway delimiters represents the specified depth.

2. The method of claim 1, wherein excluding the first search result and the subset of the set of search results comprises modifying a search result web page in cache of a web browser, wherein the search result web page comprises the set of search results.

3. The method of claim 2, wherein said modifying the search result web page comprises commenting out the selected search result and the subset of the set of search results.

4. A method for administration of search results, the method comprising:
  displaying a set of search results from a web search, each search result indicating a link to a web page;
  responsive to selection of a first of the set of search results for exclusion from display, identifying a subset of one or more of the set of search results that indicate related links, wherein the related links comprise links having a same domain name as the link of the first search result;
  excluding the first search result and the subset of the set of search results;
  performing one of:
    excluding all of the set of search results subsequent to the selected search result on a search result web page that comprises the set of search results, and
    excluding all of the set of search results preceding the selected search result on the search result web page that comprises the set of search results; and
  displaying the search results without the excluded ones of the set of search results.

5. An apparatus comprising:
  a computer processor; and
  a computer memory operatively coupled to the computer processor, the computer memory having disposed within it computer program instructions configured to:
    display a set of search results from a web search, each search result indicating a link to a web page;
    responsive to selection of a first of the set of search results for exclusion from display, identify a subset of one or more of the set of search results that indicate related links, wherein the related links comprise links having a same domain name as the link of the first search result;
    determine that the links of the subset of the set of search results match the link of the first search result up to a specified depth in the uniform resource locator pathway;
    exclude the first search result and the subset of the set of search results; and
    display the search results without the excluded ones of the set of search results;
  wherein the computer program instructions configured to determine that the links of the subset of the set of search results match the link of the first search result up to a specified depth in the URL pathway comprises the computer program instructions configured to determine that the uniform resource locators of the links of the subset of the search results match the uniform resource locator of the link of the first search result up to a specified number of pathway delimiters, wherein the specified number of pathway delimiters represents the specified depth.

6. The apparatus of claim 5, wherein the computer program instructions configured to exclude the first search result and the subset of the set of search results comprises the computer program instructions configured to modify a search result web page in cache of a web browser, wherein the search result web page comprises the set of search results.

7. The apparatus of claim 6, wherein the computer program instructions configured to modify the search result web page comprises commenting out the selected search result and the subset of the set of search results.

8. A computer program product for administration of search results, the computer program product comprising a non-transitory recording medium having computer program instructions stored therein, the computer program instructions configured to:
  display a set of search results from a web search, each search result indicating a link to a web page;
  responsive to selection of a first of the set of search results for exclusion from display, identify a subset of one or more of the set of search results that indicate related links, wherein the related links comprise links having a same domain name as the link of the first search result;
  exclude the first search result and the subset of the set of search results;
  determine that the links of the subset of the set of search results match the link of the first search result up to a specified depth in the uniform resource locator pathway; and
  display the search results without the excluded ones of the set of search results;
  wherein the computer program instructions configured to determine that the links of the subset of the set of search results match the link of the first search result up to a specified depth in the URL pathway comprises the computer program instructions configured to determine that the uniform resource locators of the links of the subset of the search results match the uniform resource locator of the link of the first search result up to a specified number of pathway delimiters, wherein the specified number of pathway delimiters represents the specified depth.

9. The computer program product of claim 8, wherein the computer program instructions configured to exclude the first search result and the subset of the set of search results comprises the computer program instructions configured to modify a search result web page in cache of a web browser, wherein the search result web page comprises the set of search results.

10. The computer program product of claim 9, wherein the computer program instructions configured to modify the search result web page comprises commenting out the selected search result and the subset of the set of search results.

11. A computer program product for administration of search results, the computer program product comprising a non-transitory recording medium having computer program instructions stored therein, the computer program instructions configured to:
  display a set of search results from a web search, each search result indicating a link to a web page;
  responsive to selection of a first of the set of search results for exclusion from display, identify a subset of one or more of the set of search results that indicate related links, wherein the related links comprise links having a same domain name as the link of the first search result;
  exclude the first search result and the subset of the set of search results;
  exclude all of the set of search results subsequent to the selected search result on a search result web page that comprises the set of search results if a first exclusion command has been indicated; and exclude all of the set of search results preceding the selected search result on the search result web page that comprises the set of search results if a second exclusion command has been selected; and display the search results without the excluded ones of the set of search results.

\* \* \* \* \*